United States Patent
Raffa

[11] 3,711,127
[45] Jan. 16, 1973

[54] DUCT BANK WITH COUPLING

[76] Inventor: Angelo M. Raffa, 886 White Plains Road, Scarsdale, N.Y. 10583

[22] Filed: July 8, 1971

[21] Appl. No.: 160,751

[52] U.S. Cl.................285/137 R, 295/55, 295/138
[51] Int. Cl..................................................F16l 39/00
[58] Field of Search........285/137 R, 133 R, 55, 138; 138/112, 113; 174/95, 96, 97

[56] References Cited

UNITED STATES PATENTS

| 247,207 | 9/1881 | Mershon | 174/96 |
| 3,469,863 | 9/1969 | Riester et al. | 285/137 R |
| 3,606,395 | 9/1971 | Salerno et al. | 285/137 R |
| 1,761,075 | 6/1930 | Gest | 138/112 |

FOREIGN PATENTS OR APPLICATIONS

| 4,051 | 0/1897 | Great Britain | 138/113 |

Primary Examiner—Dave W. Arola
Attorney—Charles Marks

[57] ABSTRACT

The ends of a duct bank are provided with flat plates having tapered tubes which accommodate the ends of ducts projecting from said duct banks. The tapered tubes are nestable in similar tubes provided on flat plates engaged with the ends of adjacent duct banks, thereby forming a sealed connection for said duct ends. The duct banks are of generally solid or hollow rectangular form or of hollow cylindrical form.

1 Claim, 7 Drawing Figures

PATENTED JAN 16 1973 3,711,127

INVENTOR.
ANGELO M. RAFFA
BY Charles Marks

DUCT BANK WITH COUPLING

BACKGROUND OF THE INVENTION

1. Field of the Invention

This invention relates to duct banks of various kinds including, among others, duct banks such as are described in a copending application filed concurrently herewith by the applicant, which said duct banks are installed underground and accommodate electrical conduits. The invention also relates to an improved means for coupling duct banks of the foregoing kind.

2. Description of the Prior Art

Heretofore, it has been customary to install electrical transmission lines in conduits disposed in underground concrete duct banks which aligned end-to-end in suitably excavated trenches or channels, the conduits in each duct bank being joined with the corresponding conduits in the adjacent duct banks. However, because of the weight and bulk of the duct banks, as well as the difficulty in adjusting them within the confined space afforded by the trenches, the task of joining the conduits in adjacent duct banks is awkward and time consuming so as to require excessive labor and time in installing the duct banks and completing the installation of which they are a part. A corresponding increase in the cost of such installation is also entailed.

Apart from this, conventional duct banks frequently fail to take account of high temperatures associated with the transmission of electricity by conductors within the conduits. Consequently, such duct banks often permit the conductors to overheat and fail by reason of "burnouts." Moreover, in many instances it is quite difficult to gain access to the interior of conventional duct banks for purposes of maintenance and repair of the conduits and conductors therein.

The present invention solves these problems.

Thus, it is an object of the present invention to provide duct banks with improved coupling means whereby they may be readily joined with a minimum of effort and skill.

Another object of the invention is to provide duct banks of the foregoing character which are of lightweight construction and permit ready access to their interior portions for purposes of maintenance and repair thereof and of the conduits and electrical conductors contained therein.

Another object of the invention is to provide duct banks of the foregoing character which may be installed in operative position with a minimum of special equipment.

A further object of the invention is to provide duct banks of the foregoing character which have improved heat dissipation qualities so as to minimize the occurrence of overheating and burnout of the conduits and conductors accommodated therein.

A still further object of the invention is to provide duct banks of the foregoing character into which inert or coolant gases may be introduced so as to improve the insulating and heat dissipating qualities of said duct banks.

Yet a further object of the invention is to provide duct banks of the foregoing character which are of simple, sturdy and economical design.

Other objects and advantages of the invention will become apparent from the following discussion when read in conjunction with the accompanying drawing.

SUMMARY OF THE INVENTION

In the present invention, a closure member is provided upon each end of a duct bank and includes one or more tapered apertures which are guidably engageable with similar apertures upon closure members provided upon adjacent aligned duct banks. Where a plurality of such apertures are provided on each of said closure members, they are disposed at spaced intervals corresponding to the spaced intervals of the mating apertures, thereby permitting quick and easy alignment and coupling of the apertures so as to permit abutment of the duct banks wherein the said apertures house the ends of the conduits projecting from said duct banks and seal them against outside contaminants.

The tapered apertures are engageable with each other even though said conduits accommodated thereby are misaligned, thereby avoiding the expenditure of time and effort otherwise required to couple such misaligned conduits.

The foregoing closure members may be employed on the ends of duct banks of conventional design. In modified forms of the invention, the duct banks are formed as hollow shells provided with adjustable spacers which support the conduits therein. A pressurized inert or coolant gas may be introduced within the hollow shell of each duct bank, the gas being sealed therein by the above mentioned closure member and any other desired end seal.

BRIEF DESCRIPTION OF THE DRAWING

In the drawing.

Throughout the various views, similar numerals are employed to refer to similar parts of the invention.

DESCRIPTION OF THE PREFERRED EMBODIMENT

Figures 1, 2, 3, 4, 5, 6, 7:
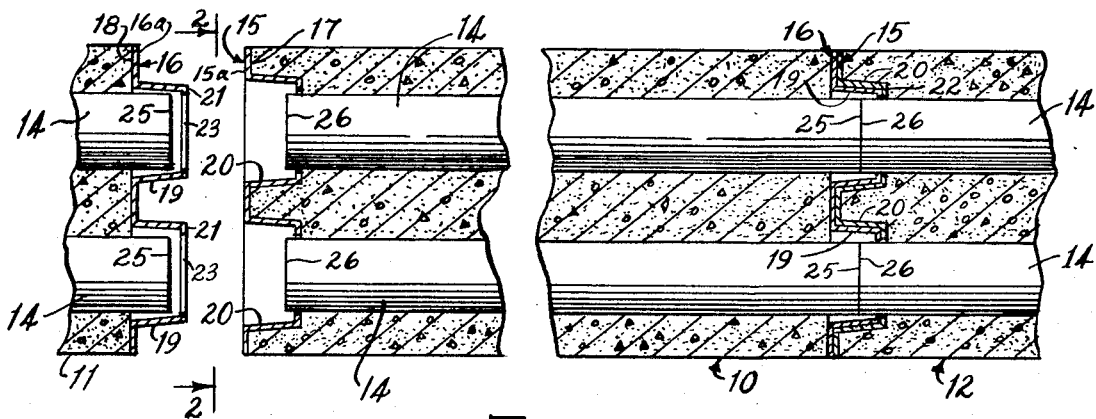
FIG. 1 is a cross-sectional, partially exploded view of duct banks incorporating one embodiment of the invention.
FIG. 2 is a view taken about the line 2—2 of FIG. 1.
FIG. 3 is a cross-sectional view of a modified form of the invention.
FIG. 4 is a view taken along the line 4—4 of FIG. 3.
FIG. 5 is a cross-sectional view of another modified form of the invention.
FIG. 6 is a view taken about the line 6—6 of FIG. 5.
FIG. 7 is an exploded fragmentary, cross-sectional view of one form of the closure members which may be employed in the invention.

As shown in FIGS. 1 and 2 of the drawing, one embodiment of the present invention comprises a housing, generally designated by the numeral 10, which is abuttable with other similar aligned housings 11, 12, as hereinafter described. Each of the housings 10, 11, 12 includes a plurality of electrical conduits or ducts 14.

Closure members 15, 16 are disposed upon the end faces 17, 18 of the housings 10, 11, 12, said closure members 15, 16 being composed of yieldable, resilient plastic material such as polyethylene or other material having similar characteristics. The closure members 15, 16 include planar plates 15a, 16a and a plurality of tapered sleeves 19, 20 having transverse end portions 21, 22 wherein are formed apertures 23, 24 which accommodate the ends 25, 26 of the electrical conduits 14.

An important feature of the invention resides in the ability of the sleeves 19, 20 to be engaged with each other even though the electrical conduits 14 may be misaligned. Thus, it will be observed that the closure members 15, 16 are preformed and that their respective sleeves 19, 20 are spaced apart on each of such closure members 15, 16 at accurately predetermined intervals, thereby permitting said sleeves 19, 20 to mate with each other in a nesting position, as depicted in FIG. 1, for example, where the housings 10, 12 are shown in operative position and the sleeves 19, 20 are in nested engagement with each other. Even if the housings 10, 11, 12 or the closure members 15, 16 are misaligned, the yieldable resilience of the material of which such closure members 15, 16 are composed permits their operative engagement in the aforementioned position, thereby sealing the interior of the sleeves 19, 20 so as to house the electrical conduits 14 in operative position and prevent entry of undesirable contaminants therein. This is accomplished even though the electrical conduits 14 may not be perfectly aligned or in continuous abutment.

A modified form of the invention is depicted in FIGS. 3 and 4 of the drawing wherein a duct bank generally designated by the numeral 29 includes a hollow cylindrical shell 30 preferably composed of a high temperature resisting cement such as Transite, which is a trademark of Johns Mansville Corporation for its asbestos-cement, or other materials of similar characteristics. The cylindrical shell 30 is provided with a suitable union 31 of conventional design and composed of a material similar to that of the cylindrical shell 30.

Within the shell 30 there are one or more upright, circular discs 32, 33 provided with a plurality of aligned apertures 34, 35 which are adapted to accommodate electrical conduits 36 of the conventional variety. The discs 32, 33 are laterally adjustable with respect to each other and are slidably engaged with the internal periphery 38 of the cylindrical shell 30, they being in abutment therewith so as to maintain them in positions which are perpendicular to the axis of the cylindrical shell 30.

Closure members 37, 37a, similar to the above described closure members 15, 16 are disposed on the ends of the cylindrical shell 29, said closure members 37, 37a being provided with circular flanges 37b which are frictionally engaged with the marginal periphery of the ends of the cylindrical shell 29. The electrical conduits 36 project into the sleeves 19, 20 of the closure members 37, 37a in the same manner as that described with respect to the electrical conduits 14 in the first-mentioned form of the invention, thereby permitting assembly of a series of such cylindrical shells 29 in axially aligned abutment, the closure members 37, 37a on adjacent such cylindrical shells 29 being nestable in each other so as to seal the interior thereof against moisture and other undesirable substances.

The cylindrical shell 29 is also provided with suitable apertures 29a, 29b through which a coolant or inert gas may be introduced to the interior of the shell 29, thereby augmenting the insulation qualities of the electrical conduits 36 therein and cooling the same so as to minimize the occurrence of burnout which might otherwise arise by reason of overheating of the electrical conductors to be accommodated therein.

So, also, if desired, a vacuum may be maintained within the cylindrical shell 29, thereby improving the insulating qualities of the region surrounding the conduits 36 or otherwise determining the heat dissipation qualities of the region around said conduits 36.

Suitable plugs 29c may be employed to seal the apertures 29a, 29b.

Another modified form of the invention is depicted in FIGS. 5 and 6 of the drawing. In this form of the invention, a rectangular shell, generally designated by the numeral 40, includes a horizontal base 41, upright side walls 42 formed integrally with the base 41 and a removable cover 43 provided with a pair of flanges 44 depending from the cover 43 and surmounting the side walls 42. The rectangular shell 40 is preferably composed of the same material as that of the previously described cylindrical shell 29.

A pair of upright members 45, 46 of generally rectangular conformation are provided with aligned, semi-circular slots 48, 49 adapted to accommodate an electrical conduit 47 of conventional design. Closure members 50, 51 are disposed on the ends of the rectangular shell 40, said closure members 50, 51 being provided with a rectangular flange 52 which is frictionally engaged with the marginal periphery of the ends of the rectangular shell 40. In a manner similar to that described with respect to the previously described forms of the invention, the electrical conduit 47 projects into tapered sleeves 48, 49 provided upon said closure members 50, 51, thereby permitting nestable engagement of said tapered sleeves 48, 49 with similar sleeves (not shown) on adjacent, aligned duct banks (not shown) and thus affording operative disposition of the electrical conduit 47 with other such conduits (not shown) in said adjacent, aligned duct banks.

Inert or coolant gases may be introduced within the rectangular shell 40 for purposes which have previously been mentioned.

Each of the above described forms of the invention may be disposed underground in accordance with conventional practice. If desired, a suitable adhesive (not shown) may be employed to affix the closure members described above to the ends of the foregoing housings.

For purposes of clarity, FIG. 7 depicts one form of the closure members which may be employed in the invention. Thus, as may be seen in FIG. 7, the closure members 60, 61 may be used to seal adjacent electrical conduits 62, 63 intended for coupling, the closure members 60, 61 including planar bases or plates 64, 65, tapered sleeves 66, 68 adapted to nestable engagement with each other and accommodating the ends of said electrical conduits 62, 63 despite their possible misalignment.

The embodiments of the invention illustrated and described hereinabove have been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

1. A duct bank accommodating a plurality of electrical conduits comprising in combination:
  a. a housing;

b. closure members provided on opposing ends of said housing;
c. each of said closure members including:
  i. a planar plate; and
  ii. a plurality of tapered sleeves depending from said planar plate;
d. said electrical conduits having end portions accommodated within said tapered sleeves;
e. said tapered sleeves being engageable with aligned tapered sleeves on adjacent duct banks accommodating adjacent end portions of electrical conduits;
f. said housing including a hollow shell;
g. upright means slidably engaged with the internal periphery of said hollow shell;
h. said upright means being provided with a plurality of apertures adapted to slidably accommodate said electrical conduits;
i. said upright means being laterally adjustable within said hollow shell;
j. said hollow shell being of rectangular conformation;
k. said hollow shell including:
  i. a base;
  ii. upright side walls formed integrally with said base; and
  iii. a closure member surmounting said upright side walls;
l. said vertical members being of generally rectangular conformation;
m. said apertures being formed as semi-circular slots in said vertical members.

* * * * *